United States Patent [19]
Bromley et al.

[11] 3,908,941
[45] Sept. 30, 1975

[54] MOTOR ATTACHMENT ASSEMBLY

[75] Inventors: Thomas D. Bromley; Marvin L. Stark, both of Anchorage, Ky.

[73] Assignee: Dover Corporation, Louisville, Ky.

[22] Filed: Feb. 12, 1974

[21] Appl. No.: 441,849

[52] U.S. Cl............................. 248/23; 74/242.13 R
[51] Int. Cl.².................... F16M 11/04; F16M 3/00
[58] Field of Search.......... 248/23, 16; 74/242.15 R, 74/242.12, 242.13 R, 242.13 A, 242.14 R

[56] References Cited
UNITED STATES PATENTS

| | | | |
|---|---|---|---|
| 1,786,192 | 12/1930 | Cullman................................ | 248/23 |
| 1,974,158 | 9/1934 | Okenfuss.............................. | 248/23 |
| 2,161,955 | 6/1939 | Dunham .............................. | 248/23 |
| 2,215,117 | 9/1940 | Cressman............................. | 248/23 |
| 2,765,997 | 10/1956 | Motts................................... | 248/23 |

FOREIGN PATENTS OR APPLICATIONS

| | | | |
|---|---|---|---|
| 740,318 | 8/1966 | Canada................................ | 248/23 |
| 728,257 | 7/1932 | France................................. | 248/23 |
| 831,100 | 3/1960 | United Kingdom.................. | 248/23 |

*Primary Examiner*—J. Franklin Foss
*Attorney, Agent, or Firm*—Emory L. Groff, Jr.

[57] ABSTRACT

A machine base adapted to support an electric motor having a driving pulley includes a fixed member containing a slidable member with screw means interconnecting same to permit relative adjustment therebetween. The base of the electric motor is secured in an elevated manner to the upper portions of a plurality of stud assemblies each having their lower portions disposed through individual slots in the fixed member and a juxtaposed opening in the slidable member with separate fastening members independently securing the lower portion of the stud assemblies to the machine base.

2 Claims, 4 Drawing Figures

U.S. Patent  Sept. 30, 1975  3,908,941
FIG. 1.
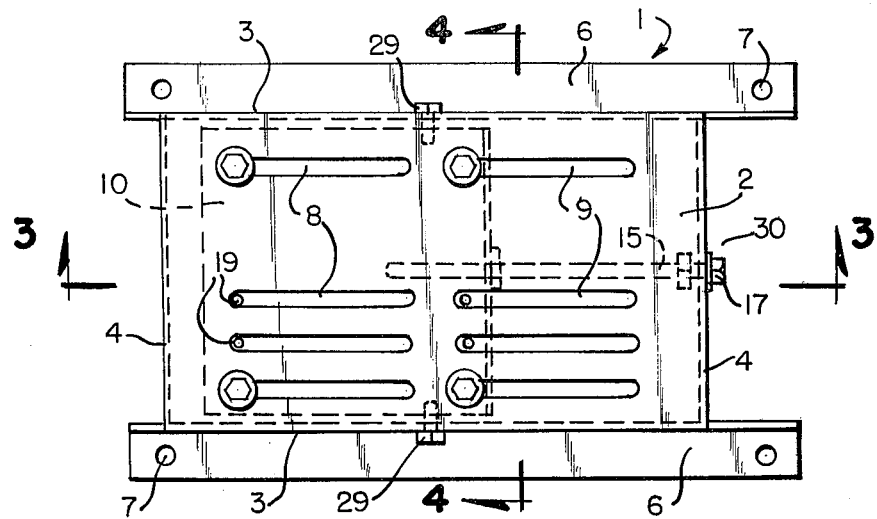
FIG. 2.
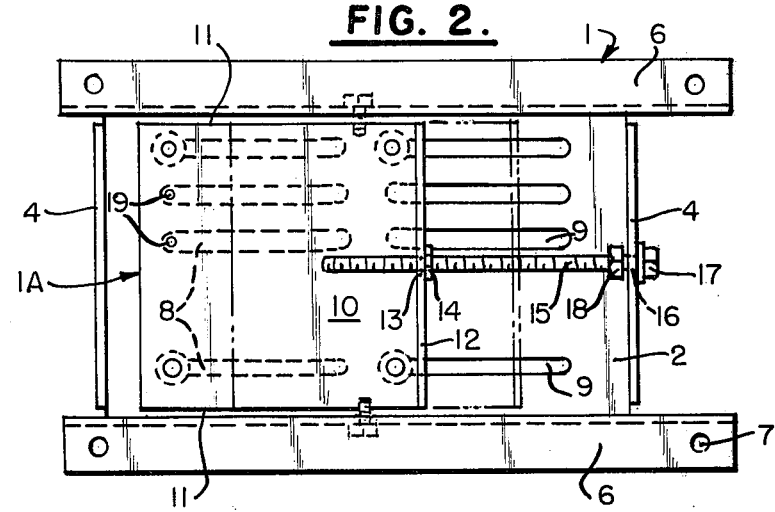
FIG. 3.
FIG. 4.
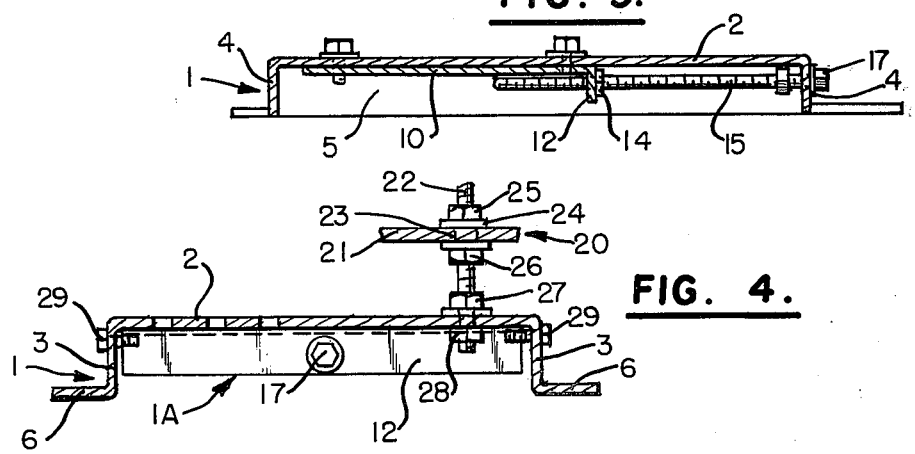

MOTOR ATTACHMENT ASSEMBLY

This invention relates generally to a machine base, and more particularly to an improved mounting arrangement for an electric motor or the like.

By the present invention an improved structure is provided which is adapted to be disposed intermediate the base of a motor and a suitable stationary foundation or support and whereby unique means is included to permit not only an accurate initial alignment of the motor with respect to the tool being operated thereby, but also allowing of ready subsequent adjustment of the motor position without affecting this previously obtained alignment. Such a feature is readily appreciated when it is realized that following initial installation, an electric motor must at least occasionally be removed for periodic maintenance and must also be quite frequently readjusted with respect to the tool being operated by the motor in order to compensate for wear of the pulley belt driven by the motor.

Prior known machine bases have offered adjustability features by means of relatively slidable components therein for some time, yet many of these have lacked total acceptability due to the fact that when the fastener members which are employed to attach the motor base to the machine base are loosened in order to achieve any adjustment of the mounting components, the alignment between the motor pulley and tool pulley is often lost.

In the case of the present invention, an improved assembly is offered wherein the base of the motor is secured in a properly aligned vertical plane and lateral position to a plurality of stud assemblies which assemblies are thereafter in turn longitudinally adjusted to the correct distance from the tool being operated by the motor and subsequently secured in this adjusted position by means of separate fasteners associated with the same stud assemblies supporting the motor base. Thereafter, should any change be necessary in the vertical alignment of the motor with respect to the tool, such changes may be made independent of any longitudinal spacing of the motor from the tool, while at the same time as longitudinal adjustment becomes necessary due to pulley belt wear, such slack may be taken up by longitudinally displacing a slide member of the motor attachment assembly without altering the vertical plane or lateral alignment of the motor base. With the motor base thus being rigidly affixed to a plurality of stud assemblies during this displacement of the adjustable slide member of the base assembly, it will follow that any tendency for the motor to move askew during adjustment of the slide member is discouraged and alignment between the motor pulley and tool pulley will be preserved.

Accordingly, one of the primary objects of the present invention is to provide an improved motor attachment assembly comprising a fixed foundation member housing therein a longitudinally slidable member which slide member is adapted to be displaced in order to alter the position of a plurality of elevated stud assemblies carried thereby.

Another object of the present invention is to provide an improved motor attachment assembly including a foundation member containing therebeneath a longitudinally movable slide member normally clamped to the bottom surface of the foundation member by means of a plurality of elevated stud assemblies and including a pair of transverse support elements carried by the foundation member to retain the slide member in close proximity to the undersurface of the foundation member when the stud assemblies are loosened.

A further object of the present invention is to provide an improved motor attachment assembly of relatively movable components having screw means for longitudinally displacing a plurality of elevated stud assemblies carried by the components and wherein a motor base is separately and adjustably secured to the elevated portions of the stud assemblies independently of fastening means for securing the lower portions of the stud assemblies to the movable components.

With these and other objects in view, which will more readily appear as the nature of the invention is better understood, the invention consists in the novel construction, combination and arrangement of parts hereinafter more fully described, illustrated and claimed.

A preferred and practical embodiment of the invention is shown in the accompanying drawing, in which:

FIG. 1 is a top plan view of the motor attachment assembly of the present invention with the upper portions of the elevated stud assemblies broken away for purposes of clarity.

FIG. 2 is a bottom plan view of the assembly as shown in FIG. 1.

FIG. 3 is a longitudinal sectional view taken along the line 3—3 of FIG. 1.

FIG. 4 is a transverse sectional view taken along the line 4—4 of FIG. 1.

Similar reference characters designate corresponding parts throughout the several figures of the drawing.

Referring now to the drawing, particularly FIG. 1, the present invention will be seen to include a foundation member, generally designated 1, comprising an inverted U-shaped element having a planar top support plate or platform 2 provided on opposite longitudinally extending edges thereof with a pair of depending side walls 3—3. A pair of end walls 4—4 depend from the opposite two edges of the support plate 2 to provide a bottom slide cavity or housing 5 within the confines of the thus described components of the foundation member 1. The foundation member is adapted to be rigidly affixed to any suitable relatively stationary structure such as a floor, work bench or tool base. This attachment is facilitated by means of a pair of flanges 6—6 laterally extending from the lower edge of each of the foundation member side walls 3 and includes a plurality of holes 7 for the reception of the selected type of fastening members. It will be appreciated that initially, when locating and installing the motor attachment assembly of the present invention, the position of the foundation member is selected according to the configuration of the electric motor intended to be supported thereby so that the drive pulley (not shown) of this motor will be generally aligned with and proximate to the driven pulley of the tool in question.

As will be seen most clearly in FIG. 1 of the drawing, the body of the top support plate 2 is provided with a plurality of elongated slots having their longitudinal axes extending longitudinally of the foundation member and parallel to one another. The slots are preferably arranged to provide a first series of adjacent slots 8 located at one end of the support plate 2 and a second series of adjacent slots 9 disposed at the other end of the top support plate.

Located beneath the top support plate 2 and disposed fully within the confines of the bottom slide housing 5 is an interior slide member 1A comprising a planar slide plate 10, the lateral edges 11 of which are disposed immediately juxtaposed the interior surface of the two side walls 3 of the foundation member 1 in order to provide a close sliding fit therebetween. The longitudinal extent of the side plate 10 will be seen to encompass a dimension which is greater than the distance extending from the left hand portion of the slots 8 to the left hand portion of slots 9 for reasons which will become apparent hereinafter. A depending flange 12 will be seen to project downwardly from one edge of the slide plate 10 as shown most clearly in FIGS. 3 and 4, and includes an opening 13 through the central portion thereof. A threaded nut 14 is fixedly attached to the depending flange 12 coaxially of the free opening 13 therein and is adapted to receive the threaded shank of an adjusting screw 15. As shown in FIGS. 2 and 3, the shank of this adjusting screw 15 further extends through a free opening 16 provided in one end wall 4 of the foundation member while the exposed distal portion of this screw is provided with a suitable head 17, which head will be understood to be securely fixed relative the shank of the screw. It should be noted that relative axial displacement between the screw 15 and the adjacent end wall 4 of the foundation member is precluded by means of a locked nut or collar 18 suitably secured to the shank of the screw so that the screw will at all times remain captive with respect to the foundation member in view of the free turning of the threads thereof within the free opening 16. On the other hand, it will be apparent that in view of the nut 14 affixed to the depending flange 12 of the slide plate 10 it will be seen that upon turning of the screw 15 by the application of a suitable tool on the head 17, the interior slide member 10 will be longitudinally displaced relative to the top support plate 2 within the confines of the bottom slide housing 5.

The plate 10 of the slide member is provided with a plurality of openings 19 disposed in vertical alignment with the elongated slots 8 and 9 through the top support plate 2. At least one opening 19 is formed juxtaposed each of the slots 8 and 9, yet it will be readily apparent that a plurality of longitudinally adjacent openings 19 may be included in cooperation with each one of the slots in the top support plate for reasons which will be appreciated hereinafter.

Cooperating with the components thus described, are a plurality of elevated stud assemblies, generally designated 20 and which are disclosed most clearly in FIG. 4 of the drawing. The particular electric motor adapted to be used with the present invention will be understood to be provided with a suitable motor base 21, and it is this base which is fixed in a secure manner to the upper portion of each one of a plurality of studs 22. During initial assembly, each stud 22 is inserted through one motor base slot 23 and securely clamped thereto by means of a washer 24 and top motor nut 25 disposed above the motor base 21 and a similar washer 24 and bottom motor nut 26 disposed underneath the motor base 21. The lower reach of each stud 22 passes, with a close sliding fit, through a selected one of the slots 8 or 9 as well as the selected one of the openings 19 in the underlying slide plate 10 as shown in FIG. 4 of the drawing, and is secured in the selected elevated position by a top stud nut 27 and bottom stud nut 28, each of which includes a suitable washer therebeneath. With the understanding that four of the elevated stud assemblies 20 are usually provided for each motor installation, each one of which is arranged as above-described, it will be seen that during the initial installation of a motor the proper vertical alignment between the drive pulley of the motor and the driven pulley of the work tool may be selected by the selective placement of the respective nuts on the stud 22. When this has been achieved the top motor nut 25 and bottom motor nut 26 are tightened to securely clamp the motor by means of its base 21 relative to the stud assemblies 20. The stud nuts 27 and 28 are loosely tightened at this point until the pulley belt has been installed and properly adjusted as will now be described.

Following installation of the belt about the electric motor pulley and the tool pulley, the slack is taken up by a simple maneuver comprising the turning of the adjustment screw 15. This is achieved by the application of a wrench or other tool to the integral or fixed head 17 of the screw, and since the only direct coupling between this screw and the motor attachment assembly is the nut 14 carried by the interior slide member, it will be seen that upon turning of the screw 15 in one direction the slide plate 10 will be drawn toward the location of the screw head 17 and in view of the closely fitting opening 19 in the slide plate through which each of the studs 22 pass, the four stud assemblies carrying the motor base 21 will be moved longitudinally of the foundation member 1 until the proper adjustment of the motor between its tool is achieved. At this point it is only necessary to tighten the top stud nut 27 of each elevated stud assembly 20 in order to securely anchor the entire motor base 21 and during the tightening of these nuts 27 there is absolutely no misalignment between the motor base and the tool due to the fact that the studs 22 themselves are not moved at all during manipulation of either the stud nut 27 or 28.

It will be appreciated that normally, whenever the top stud nuts 27 should be loosened, which action actually lowers the respective stud 22, the slide plate 10 itself would be lowered under the influence of gravity and since usually one top stud nut 27 is being loosened at a time it will follow that the slide plate 10 may become canted or bind within the limited lateral spacing of the bottom slide housing 5. In order to preclude any verticle displacement of the slide plate 10 upon manipulation of any of the stud nuts 27, a transverse support element 29 comprising a longitudinal member, is mounted through the medial portion of each side wall 3 of the foundation member and will be seen to project inwardly into the confines of the slide housing 5 a sufficient distance to at all times immediately underlie the bottom surface of the slide plate 10 adjacent both sides thereof. Thus a definite sliding trackway is provided between which the slide plate 10 will at all times be disposed so that the only movement that can be made by the slide plate is longitudinally and in a single plane immediately juxtaposed the under-surface of the foundation member top support plate 2.

Preferably each of the side walls 3—3 with the integral laterally extending attachment flange 6 extends from at least one end of the foundation member 1 a substantial distance as shown in FIGS. 1 and 2 in order to provide a protected area 30 within which is disposed the head 17 of the screw 15. The advantage of such construction will be readily apparent when it is realized that in an industrial environment heavy work pieces and equipment are often moved in the area of a motor attaching assembly and it is desired that suitable protection be afforded the adjustment screw head.

We claim:

1. An attachment assembly for an electric motor provided with a motor base comprising, a foundation member having a raised planar top support plate provided with a plurality of parallel and axially aligned elongated slots therethrough, side walls depending from opposite sides of said support plate, at least one end wall depending from said support plate, an interior longitudinally shiftable slide member having a planar integral slide plate disposed beneath said top support plate and including a plurality of holes therethrough at least two of which are vertically aligned with respective ones of said slots in said support plate, retaining means carried by the medial portion of each said side wall and extending beneath said support plate to support said slide plate immediately juxtaposed the undersurface of said support plate while allowing of relative longitudinal movement therebetween, said retaining means disposed clear of said slide member holes throughout the longitudinal shifting of said slide member, screw means axially fixed to the medial portion of said foundation member end wall and threadedly engaging said slide member to longitudinally displace said slide plate and holes relative said support plate and slots, a transverse depending flange at one end of said slide plate, a threaded fastener affixed to the medial portion of said slide plate flange and receiving said screw means, a plurality of elevated stud assemblies each having a stud disposed through one said slot and hole, the upper portion of each said stud disposed through an opening in said motor base, threaded fasteners engaging the lower portion of both sides of said motor base to secure the base in a position elevated from said support plate, and separate threaded fasteners engaging the lower portion of each said stud with one said separate fastener disposed above said support plate and another said separate fastener disposed beneath said slide plate for each said stud to rigidly clamp said integral slide plate to said support plate whereby, upon the release of either one of said fasteners engaging each of said stud lower portions said slide plate is unclamped from said support plate and rests upon said retaining means such that subsequent actuation of said screw means permits of longitudinal shifting of said integral slide plate with concurrent shifting of all said stud assemblies without interference between said stud assemblies and said retaining means.

2. An attachment assembly according to claim 1 wherein, said pair of side walls extend beyond at least one end of said support plate to provide a protected area therebetween and said screw means includes a screw having a head disposed adjacent said end of said support plate between said extending side walls.

* * * * *